(12) United States Patent
Di Grazia

(10) Patent No.: US 9,297,905 B2
(45) Date of Patent: Mar. 29, 2016

(54) METHOD OF ACQUIRING CDMA-MODULATED SATELLITE SIGNALS AND RECEIVING APPARATUS IMPLEMENTING THE METHOD

(71) Applicant: STMicroelectronics S.r.l., Agrate Brianza (IT)

(72) Inventor: Domenico Di Grazia, Cesa (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 569 days.

(21) Appl. No.: 13/719,798

(22) Filed: Dec. 19, 2012

(65) Prior Publication Data
US 2013/0169480 A1  Jul. 4, 2013

(30) Foreign Application Priority Data
Dec. 28, 2011  (IT) .............. MI2011A2416

(51) Int. Cl.
*G01S 19/29* (2010.01)
*G01S 19/30* (2010.01)

(52) U.S. Cl.
CPC *G01S 19/30* (2013.01); *G01S 19/29* (2013.01)

(58) Field of Classification Search
CPC .......... G01S 19/29; G01S 19/30; G01S 19/37
USPC ........... 342/357.63, 357.68, 357.69; 701/467, 701/468
See application file for complete search history.

(56) References Cited

U.S. PATENT DOCUMENTS

| | | |
|---|---|---|
| 6,643,320 B1 | 11/2003 | Wilcox et al. |
| 7,403,558 B2 | 7/2008 | Mattos et al. |
| 2003/0118086 A1 | 6/2003 | Pietila et al. |
| 2006/0152409 A1 | 7/2006 | Raman et al. |

OTHER PUBLICATIONS

Italian Search Report, dated Aug. 28, 2012 for International Application No. MI20112416, 9 pages.
Ward, "GPS Receiver Search Techniques," Position Location and Navigation Symposium, *IEEE*, New York, NY, Apr. 22, 1996 and Atlanta, GA, Apr. 22-26, 1996, 9 pages.
Lin, David M. et al., "Sensitivity Limit of a Stand-Alone GPS Receiver and an Acquisition Method," Ion GPS 2002, Sep. 24-27, 2002, Portland, OR, 5 pages.

*Primary Examiner* — Dao Phan
(74) *Attorney, Agent, or Firm* — Seed IP Law Group PLLC

(57) ABSTRACT

A method of acquiring a satellite signal includes providing a CDMA-modulated signal, defining a first search frequency interval and a first reception sensitivity, and performing a first acquisition of the modulated signal according to the first sensitivity and the first frequency interval in order to provide an acquisition or failed acquisition result. In case of a failed acquisition, performing a second acquisition of the modulated signal as a function of a second search frequency interval, narrower than the first frequency interval, and a second reception sensitivity, greater than the first sensitivity and depending on a power of a side lobe of the modulated signal.

20 Claims, 9 Drawing Sheets

METHOD OF ACQUIRING CDMA-MODULATED SATELLITE SIGNALS AND RECEIVING APPARATUS IMPLEMENTING THE METHOD

BACKGROUND

1. Technical Field

The present disclosure refers to satellite positioning systems and particularly techniques for acquiring CDMA-type satellite signals.

2. Description of the Related Art

The satellite signals used in the GNSS (Global Navigation Satellite System) are of the CDMA-type (Code Division Multiple Access). The satellite signals reception at the receiving apparatus provides the following sequentially performed standard steps: frequency conversion and digitization, acquisition, tracking, decoding and positioning.

A radio-frequency stage processes the analog signals received at the satellites and converts them at an intermediate frequency, and an analog-digital converter converts the intermediate frequency signals to corresponding digital signals.

The intermediate frequency-converted signal has frequency offsets due to offsets of the local oscillator used for the conversion and due to Doppler effects caused by the motions of the satellites and receiving apparatus.

In the acquisition of CDMA signals from satellites, there are two main operative states: the "Cold Start" state and the "Hot/Warm start" state.

In the "Cold Start" state, it is assumed that the Doppler shift due to the satellite and receiving apparatus' motions is completely unknown.

In the "Hot/Warm start" state, a high-point (e.g., maximum) Doppler uncertainty at the reception is considered null because in such state it is possible to predict both the satellites in view and their velocities by assuming a known position (corresponding to the position available at the moment of the previous switching-off) and the time (generated by the inner backup clock).

With reference to the "Hot/Warm start" assumption, the acquisition step, managed by a corresponding acquisition block, performed for the generic satellite, provides a calculation of a plurality of correlations among the intermediate frequency-converted signal from the satellites, and locally generated test signals.

Such test signals are generated by performing a frequency scan in a frequency range which should take into account the frequency offsets of the local oscillator and Doppler shifts. Moreover, the test signals are also generated by a phase or code position scan providing the phase shift of a locally generated pseudo-random replication code.

The calculation of each correlation is performed by a numerical integration on a band exclusively related to an elementary integration period adopted by limits set by the Nyquist theorem.

The correlator output associated to any possible phases or code positions and on each search frequency scan (bin) can be generally considered as a complex signal, in other words an associated power information.

Document U.S. Pat. No. 7,403,558 describes an acquisition technique enabling to speed up the correlations calculation.

After the correlations calculation, the individuation of the code-\l frequency pair taking to a maximum correlation value is performed.

Techniques intended to improve the performances in the Hot/Warm start state are known. For example, it is considered the paper by David M. Lin et al. "Sensitivity Limit of a Stand Alone GPS Receiver and An Acquisition Method", ION GPS 2002, 24-27 Sep. 200, Portland, Oreg., which discusses some modes intended to increase the sensitivity of the receiving apparatus, and analyzes two approaches.

The reception sensitivity can be quantified by the "minimum signal/noise ratio Q" parameter defined as the low-point (e.g., minimum) signal/noise ratio associated to the signal from the satellite as received at the receiving apparatus and detected by a probability of detection (POD), wherein POD is a project value.

Referring back to the paper by David M. Lin et al., according to the first approach, in order to increase the sensitivity of the integration scan, it is performed a coherent integration on a longer time range, in other words it is increased the duration of each integration step.

The second approach is based on a combination of coherent and incoherent integrations. The second approach provides that more integration steps are done, that is steps of correlation calculation, at the same frequency as the test signal and in cumulative time ranges. The results of these integrations are accumulated before evaluating which is the selected candidate.

It is demonstrable that each time the number of consecutive and disjoined (or incoherent) integration steps executed at the same frequency is doubled, the scan sensitivity is increased by 1.5 dB.

Moreover, the above mentioned paper by David M. Lin et al. demonstrates that the scan sensitivity, given a fixed number of total steps, improves of 3 dB each time the duration of an elementary step is doubled.

It has been observed that the coherent integration technique reduces the elementary band covered by the work scan (band which, according to the Nyquist theorem, is therefore halved each time the coherent time is doubled) and therefore it is subjected, when the correctness assumption of frequency fails, and given an initial determined uncertainty, to the scan of a greater number of potential bins and to a total typical greater time.

Moreover, it has been observed that the coherent integration cannot be directly used in the Hot/Warm start state because when the searched frequency is outside the work bin, due to a prediction error, the dynamics of the receiving apparatus, or the drift of the local oscillator, would make the receiving apparatus vulnerable to alias phenomena. In other words, the satellite signals transmitted would not be hooked and tracked but instead, the replications generated by the side lobes of the spectrum itself would be the ones which fall in the search band. Such side lobes, although weaker than the main lobe signal (typically 30 dB for a GNSS), can be practically acquired by high sensitivity scans performed on erroneous bands and at the end will be erroneously detected as a main lobe to be tracked with consequent frequency and position errors.

BRIEF SUMMARY

It has been observed that the known acquisition techniques do not offer satisfying performances regarding the different needs of sensitivity, robustness with reference to alias, and acceptable processing times.

This problem is addressed by a method of acquiring satellite signals according to the independent claims. The dependent claims define other possible embodiments. The claims may also refer to a receiving apparatus containing an acquisition module arranged to perform the method.

BRIEF DESCRIPTION OF THE SEVERAL VIEWS OF THE DRAWINGS

For a better comprehension and appreciation of its advantages, in the following some exemplifying non limiting embodiments will be described with reference to the attached drawings. Non-limiting and non-exhaustive embodiments are described with reference to the following drawings, wherein like labels refer to like parts throughout the various views unless otherwise specified. One or more embodiments are described hereinafter with reference to the accompanying drawings in which.

DETAILED DESCRIPTION

Figure 1:
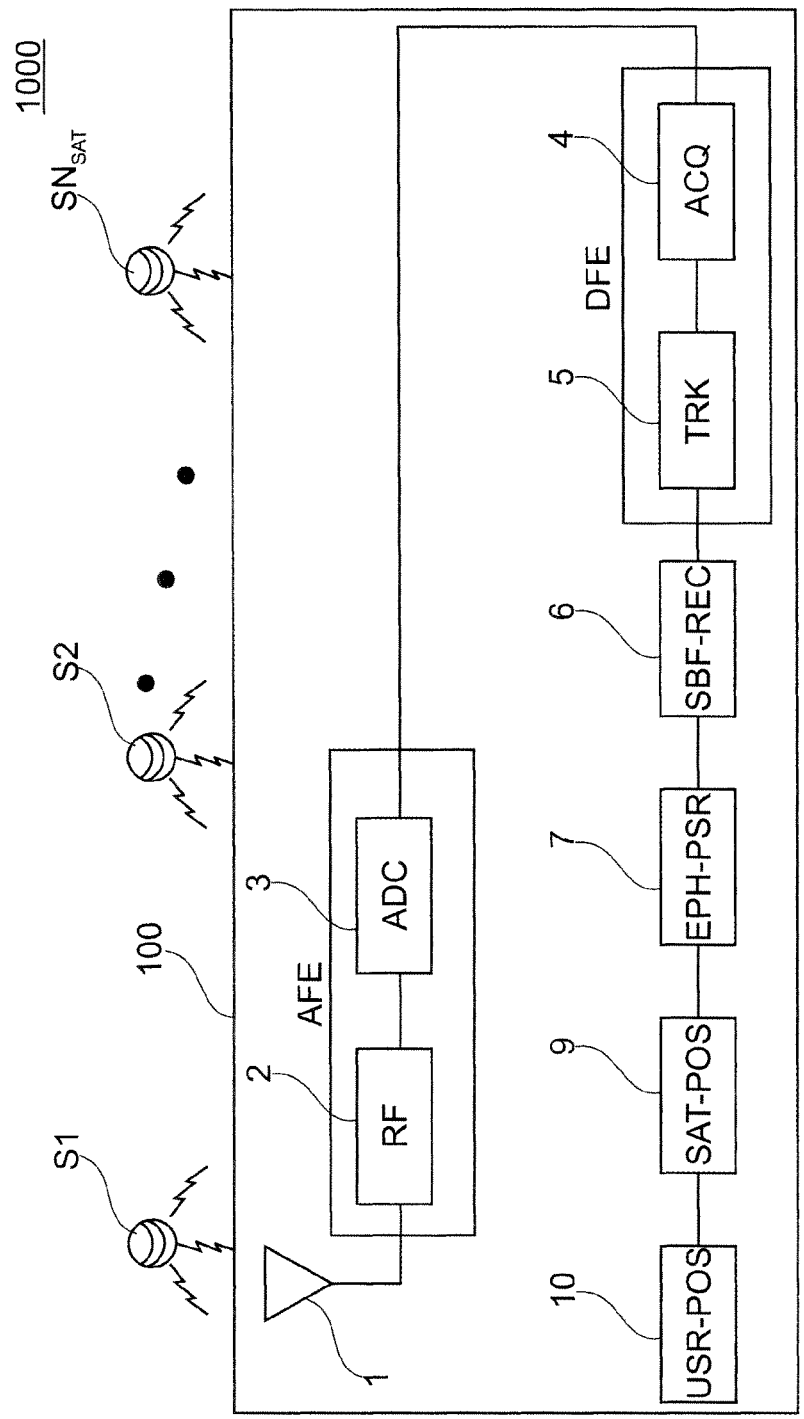
FIG. 1 schematically shows a satellite positioning system comprising a receiving apparatus.

FIG. 1 schematically shows a system GNSS 1000 (Global Navigation Satellite System): such as, for example, the Global Positioning System (GPS), Global'naya Navigatsionnaya Sputnikovaya (GLONASS), Galileo System, or other types of satellite-based positioning systems.

The global satellite positioning system 1000 comprises a constellation of satellites S1-$SN_{SAT}$ and at least one receiving apparatus 100. In a particular embodiment, the receiving apparatus 100 comprises an antenna 1, an analog reception module AFE, provided with a radio-frequency (RF) stage 2, and an analog-digital converter 3 (ADC), which can be realized employing hardware modules.

Moreover, the receiving apparatus 100 comprises a digital processing module DFE, including an acquisition module 4 (ACQ), and a tracking module 5 (TRK).

Further, the receiving apparatus 100 is provided with a sub-frame retrieving module 6 (SBF-REC), an ephemeris processing and pseudo-range calculation module 7 (EPH-PSR), a satellite position calculation module 9 (SAT-POS) and a user position calculation module 10 (USR-POS).

In a particular embodiment, the acquisition module 4 and the tracking module 5 are hardware implementable while the remaining modules 6-10 are software-implementable.

The receiving apparatus 100 is provided with a central processing unit, memories (mass memories and in addition or alternatively working storages) and respective interfaces (not shown in figures), comprising a microprocessor or a microcontroller, for executing software resident in it.

The following embodiments are described in a non limiting way with reference to the GPS technology, however, the teachings of the present description can be applied also to other satellite positioning systems.

When the receiving apparatus 100 is operating, antenna 1 receives a plurality of signals from one or more satellites S1-$SN_{SAT}$ of the satellite constellation operating in system 1000. For example, these signals are modulated on a carrier with a frequency of 1.5 GHz. Particularly, each received signal transports a pseudo-random code and a message for the data communications.

The pseudo-random code, known as CA, for example at 1 MHz, is used for distinguishing one satellite from another and enables the receiving apparatus 100 to measure the time instant in which the signal has been transmitted by the corresponding satellite.

The data navigation message transports data (for example at a bit rate equal to 50 Hz) and particularly it is modulated by the technique Binary Phase Shift Keying (BPSK). Further, the data navigation message is hierarchically subdivided into frames and sub-frames that carry information, among which are a plurality of parameters used in determining the orbit and consequently the satellite position.

The radio-frequency stage 2 operates on signals received from antenna 1 (of the analog type) and performs a base-band or intermediate frequency conversion of them. The analog-digital converter 3 converts the intermediate frequency signals into corresponding digital signals. The acquisition module 4 enables detection, based on output digital signals from the analog-digital converter 3, of which satellites of the constellation S1-$SN_{SAT}$ are in view, in other words for which satellites it is received a signal suitable for their identification.

Further, the acquisition module 4 detects a plurality of parameters associated with the satellites, and used for the time satellite tracking. The tracking module 5 has several channels, and each channel is allocated to a different satellite. Particularly, the tracking module 5 is configured for operating as a frequency locked loop. Based on a further embodiment, the tracking module 5 is configured for making up a frequency locked loop.

The tracking module 5 is arranged for providing data to the sub-frame retrieving module 6, as a time sequence of sample pairs, indicated as {I, Q}. Each sample {I, Q} is the result of an in phase and quadrature coherent integration, respectively, for example for each bit period of 20 ms, performed by a correlator (not shown) included in the tracking module 5. Based on the Binary Phase Shift Keying (BPSK) modulation technique, each sample pair {I, Q} represents a transmitted bit.

As it is well known in the digital communications theory field, each sample {I, Q} can be further interpreted as a phasor, by considering the I and Q values as the real and imaginary parts of a two-dimensional vector in the complex Cartesian plane.

Further, for each satellite, in the tracking module 5, the Doppler frequency and the transfer time of GPS signals transmitted by a satellite S1-$SN_{SAT}$ are determined.

The sub-frame retrieving module 6, by suitable algorithms, decodes the different received sub-frames forming the data navigation message. The ephemeris processing and pseudo-range calculation module 7 stores the satellite orbit as ephemeris data. The ephemeris processing and pseudo-range calculation module 7 calculates the distances existing among satellites and the receiving apparatus 100; such distance is called pseudo-range. By these calculated values, and through the transfer time of GPS signals, the satellite position calculation module 9 calculates the satellite positions expressed by three dimensional (3D) coordinates, at the transmission instant.

In this embodiment, the satellite position calculation module 9 operates as a function of the GPS signal transfer time in conjunction with the reception time (known thanks to a clock in the receiving apparatus 100). The satellite position calculation module 9 operates in order to evaluate how long does it take for the signal from each satellite to reach the receiving apparatus 100, by evaluating in this way the distance from the respective satellite (pseudo-range).

By a triangulation algorithm, the user position calculation module 10 calculates the position of the receiving apparatus 100 as a function of the distances of the receiving apparatus 100 preferably from at least four satellites and as a function of the positions of the same satellites, known at this processing step. In the following, the reception apparatus 100 position (practically coincident with the user position) will be called "fix".

Structural Description of a Particular Embodiment of the Acquisition Module 4.

Figure 2:
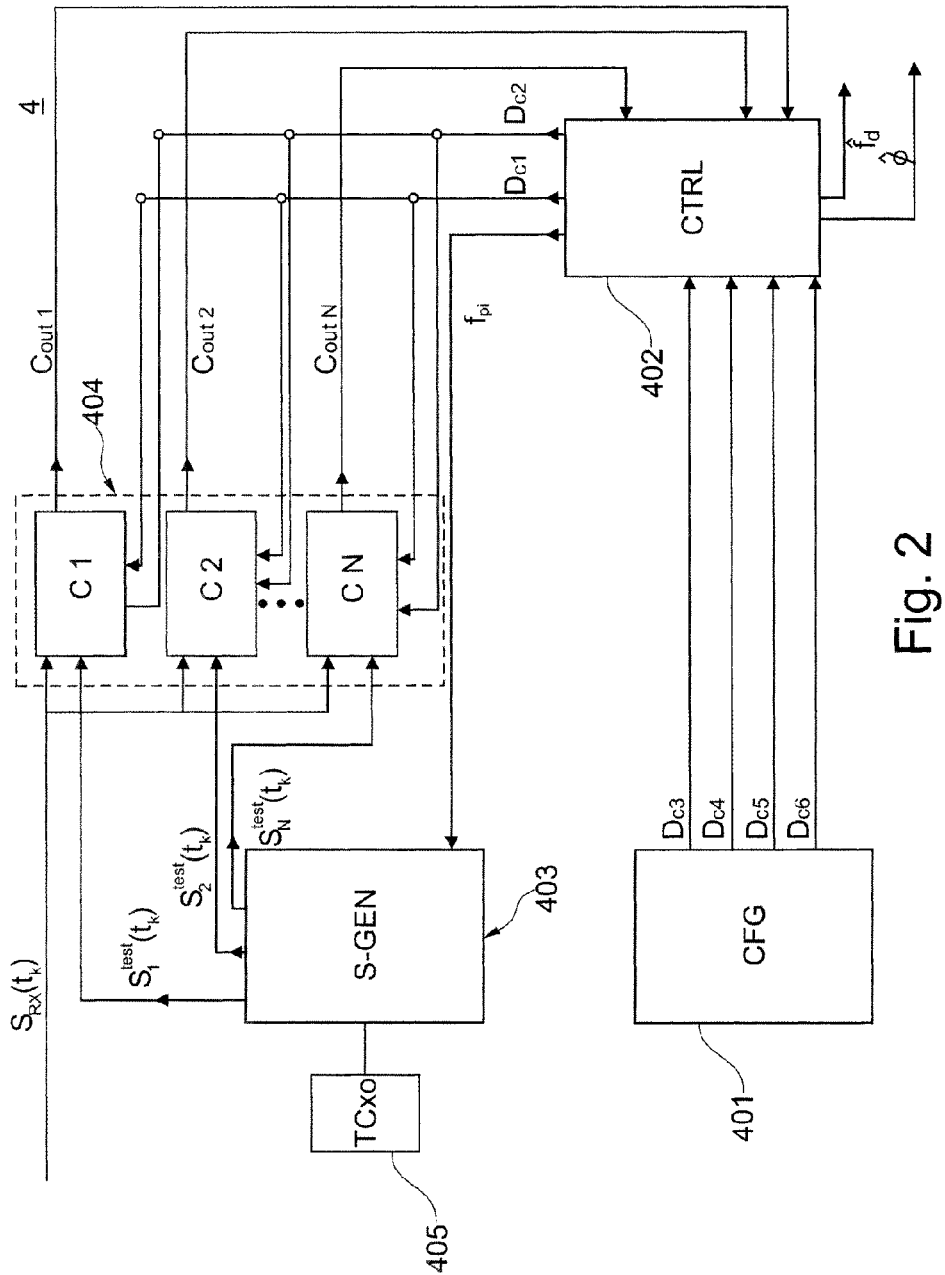
FIG. 2 schematically shows an acquisition module of said receiving apparatus.
Figure 3:
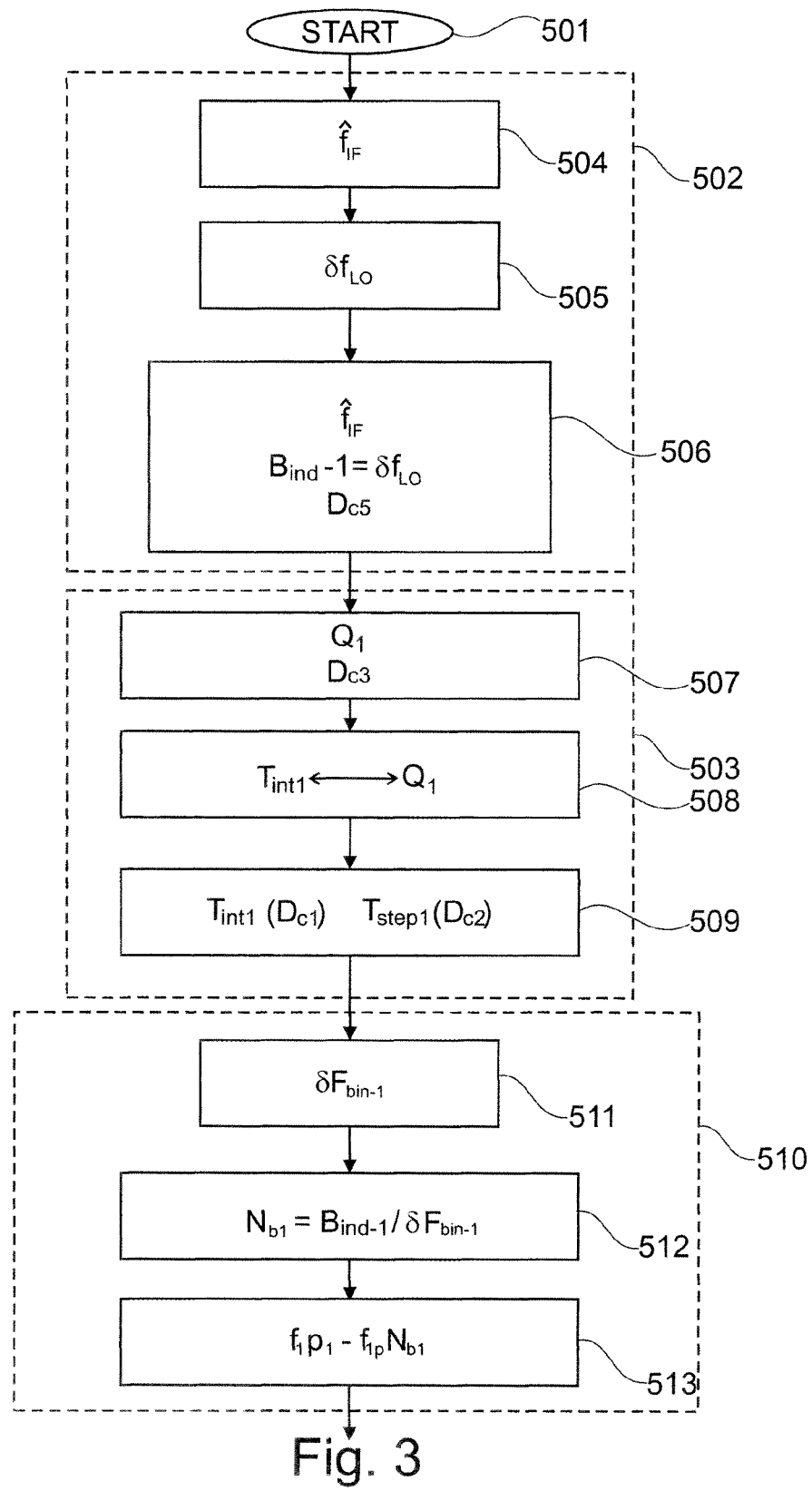
FIG. 3 is a flow diagram showing a first band configuration step, a first sensitivity configuration step, and a first frequencies calculation step, all being part of an acquisition method.
Figure 4:
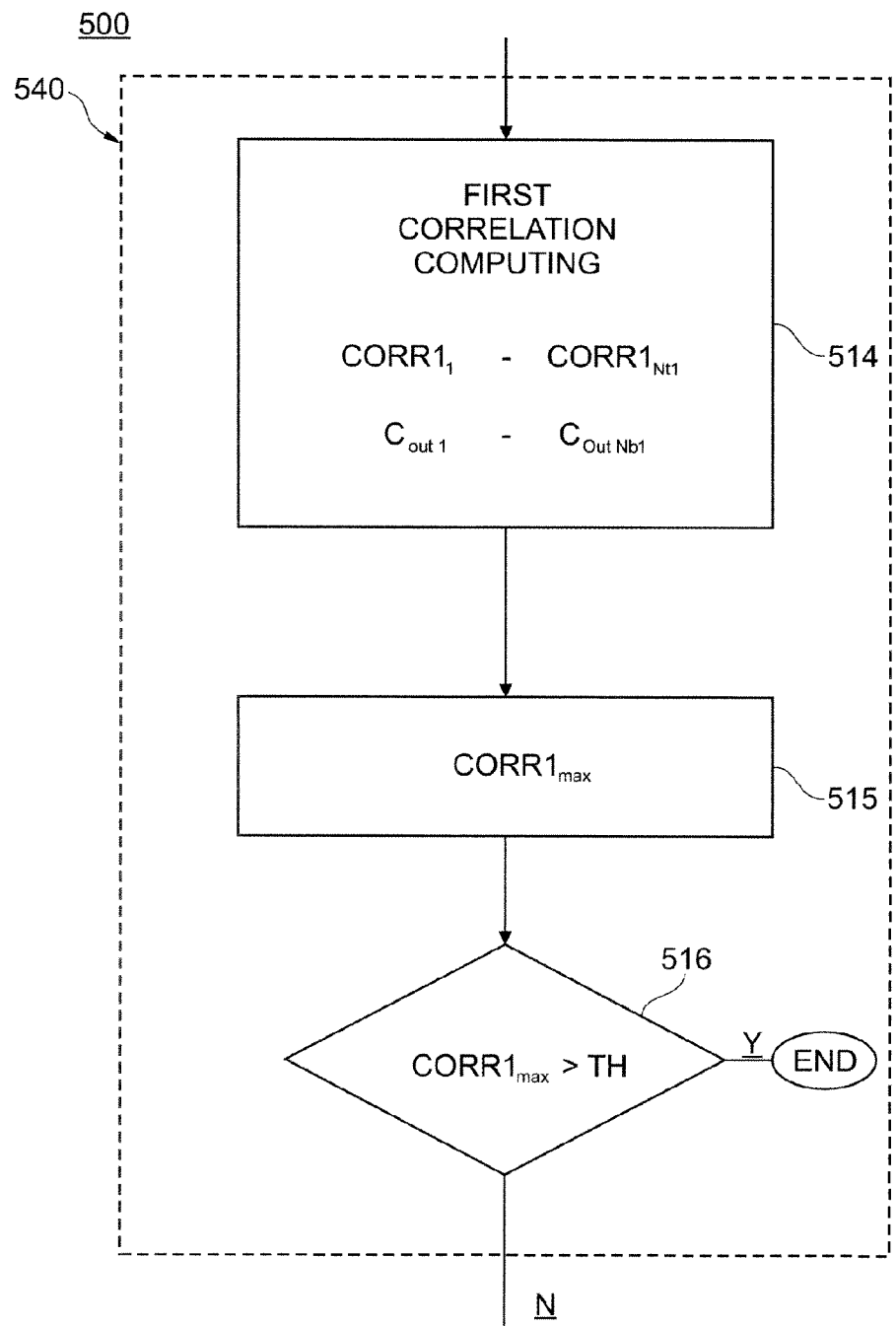
FIG. 4 is a flow diagram showing a first acquisition step comprising a first correlations calculation step, a first selection step, and a first comparison step, all being part of the acquisition method.
Figure 5:
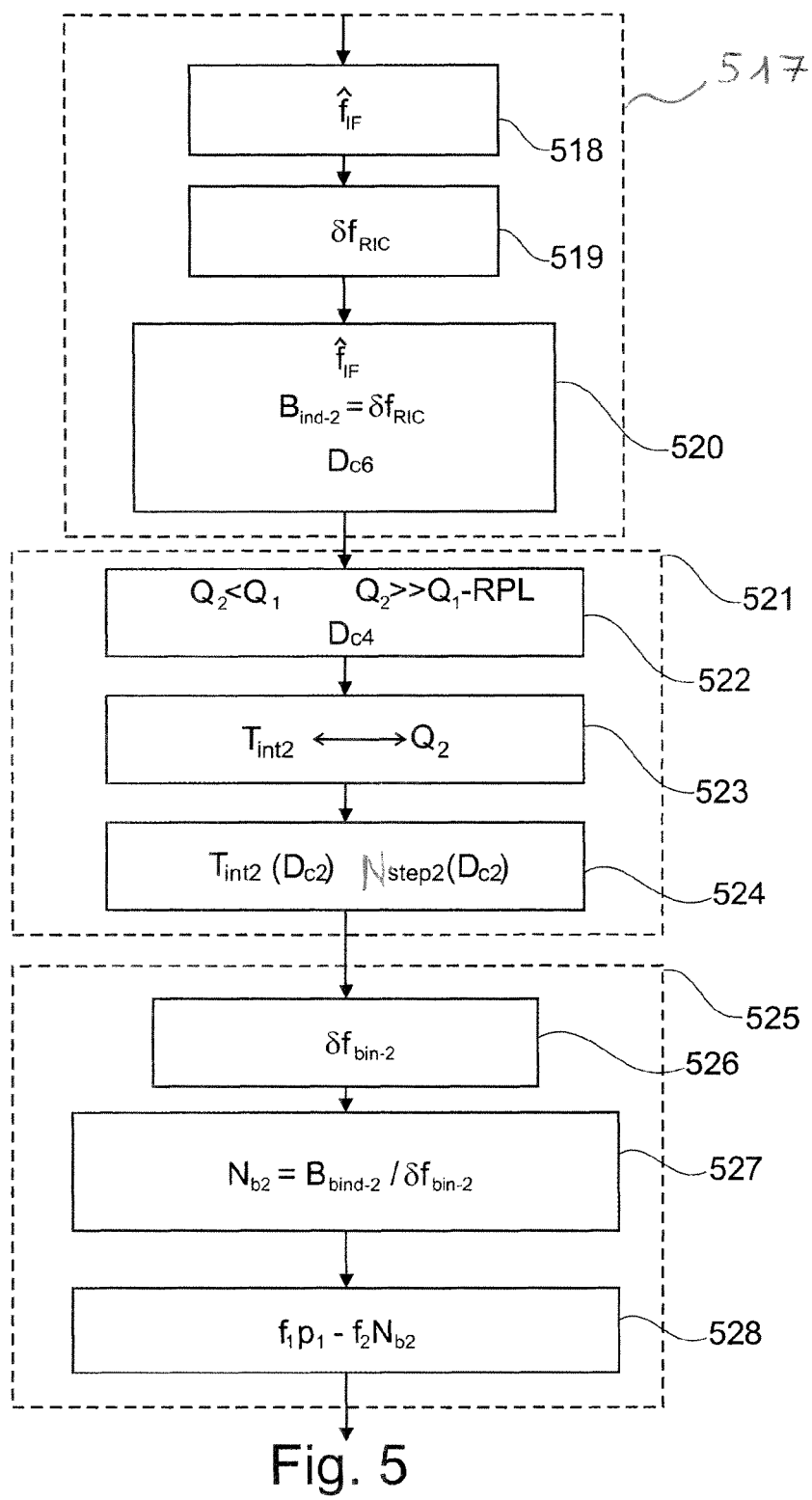
FIG. 5 is a flow diagram showing a second band configuration step, a second sensitivity configuration step, and a second frequencies calculation step, all being part of the acquisition method.
Figure 6:
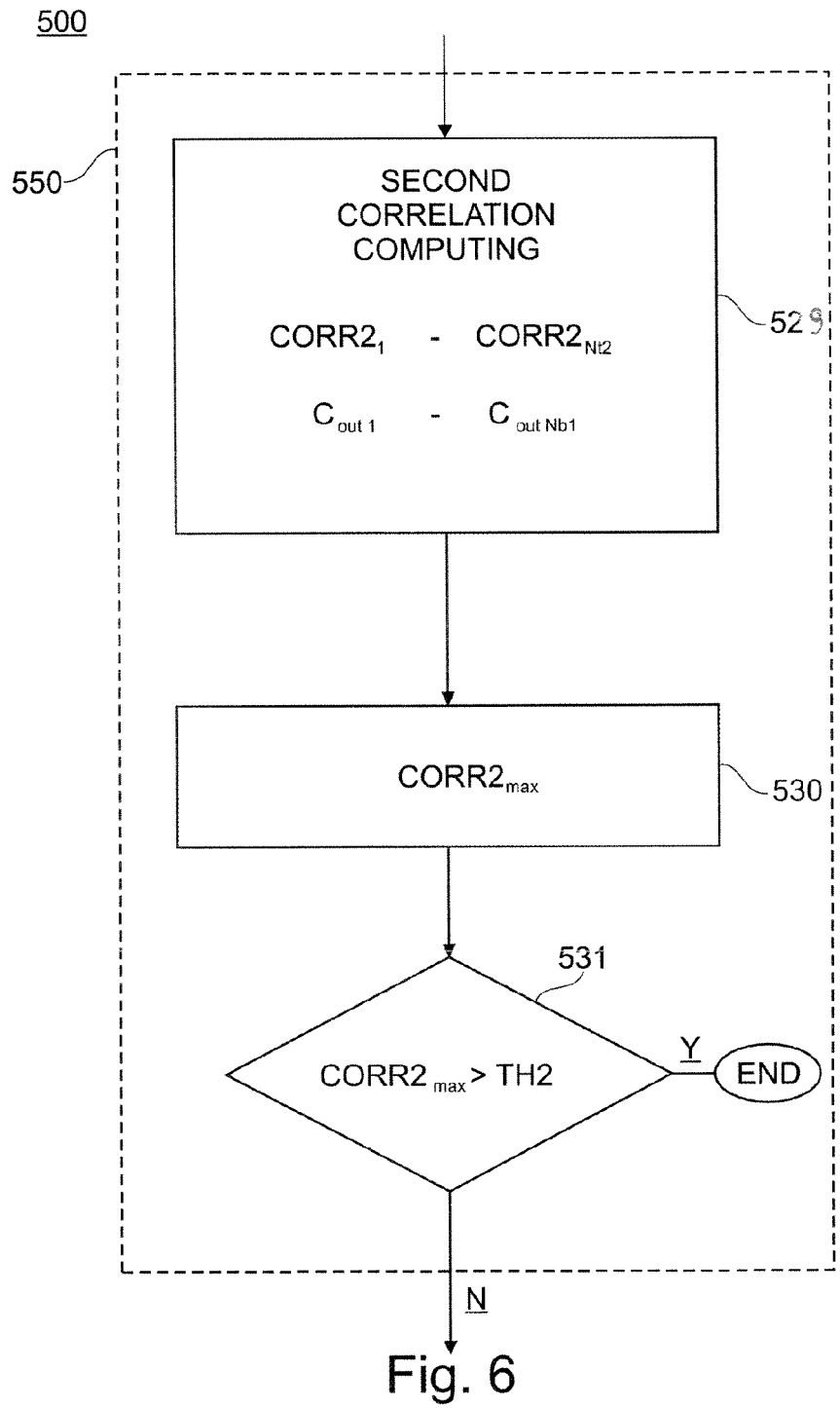
FIG. 6 is a flow diagram showing a second acquisition step comprising a second correlations calculation step, a second selection step, and a second comparison step, all being part of the acquisition method.

FIG. 2 shows a particular embodiment of the acquisition module 4 comprising: a configuration module 401 (CFG), a controller module 402 (CTRL), a test signals generation device 403 (S-GEN), and a correlators bank 404.

The correlators bank 404 comprises a plurality of correlators C1-CN configurable by a first configuration datum $D_{C1}$ representing a time coherent integration range, and a second configuration datum $D_{C2}$, indicating a number of incoherent integration steps. Correlators C1-CN are structurally identical one to the other and each of them is provided with a first input for receiving a digital signal to be acquired $s_{RX}(t_k)$, which is the result of the sum of signals transmitted by satellites S1-SN$_{SAT}$, received at antenna 1 and intermediate frequency-converted $f_{IF}$ (or base band-converted) and digitally converted by the analog reception module AFE.

Further, each correlator C1-CN is provided with a corresponding input for receiving a respective test signal $\{s_1^{test}(t_k) \ldots s^{test}_N(t_k)\}$, generated by the test signal generation device 403 (SGEN).

As it is known to the person skilled in the field, the CDMA-modulated signals have a radio-frequency $f_c$ carrier amplitude-modulated by a suitable binary sequence known as a spreading sequence or pseudo-random noise code (PRNC) D(t) having a code period T. A CDMA-modulated signal $s^n(t)$ of this type, transmitted by the n-th satellite uniquely characterized by a pseudo-random code $D^n(t)$, can be mathematically represented by the following formula:

$$s^n(t) = D^n(t) \times \cos(2\pi f_c t + \phi) \quad (1)$$

Antenna 1 of the receiving apparatus 100 receives a signal s(t) given by a sum of signals of the type expressed by formula (1), particularly one for each satellite visible from the receiving apparatus 100, and expressed by the following formula:

$$s(t) = \sum_{n=0}^{M-1} s^n(t) \quad (2)$$

Wherein M represents the number of satellites visible from the receiving apparatus 100.

The acquisition module 4 receives the following digital signal $s_{RX}(t_k)$ corresponding to the signal of formula (2), intermediate frequency $f_{IF}$ shifted, sampled and digitally converted to its in phase $s_I(t_k)$ and quadrature components $s_Q(t_k)$:

$$s_I(t_k) = \sum_{n=0}^{M-1} D^n(t_k) \times \cos(2\pi f_{IF} t_k + \phi)$$

$$s_Q(t_k) = \sum_{n=0}^{M-1} D^n(t_k) \times \sin(2\pi f_{IF} t_k + \phi)$$

$$s_{RX}(t_k) = \sum_{n=0}^{M-1} s_I^n(t_k) + j s_Q^n(t_k)$$

Referring for example to correlator C1, the basic formula of such correlator is:

$$\sum_{k=0}^{N-1} s_{RX}(t_k) \cdot s_1^{test}(t_k) \quad (3)$$

Formula (3) expresses the correlation operation, that is a coherent integration operation of numerical type (that is of the discrete time type). Such coherent integration is defined by a summation extended to a time coherent integration range Tint, of the values obtained by multiplying the signal samples $s_{RX}(t_k)$ entering the acquisition module 4 and the samples of a test signal $s_1^{test}(t_k)$ reproduced inside the acquisition module 4.

The time coherent integration range Tint is given by one or more code periods T:

$$Tint = m^*T = m^*N^*Ts \quad (4)$$

Wherein:
N is the number of chips contained in each pseudo-random code,
Ts is the duration of the elementary chip of the pseudo-random code, submultiple of the sampling period in which the analog-digital converter 3 operates,
m is a project parameter defining the code period number T, which the correlation operation corresponding to formula (3) extends for.

Referring for example to the acquisition of a signal from the q-th satellite $S_q$, to the test signal $s_1^{test}(t_k)$ is associated the pseudo-random code $D_k^q$ of the q-th satellite, a suitable code phase $\phi_1 = 1$ and a suitable test intermediate frequency fp, which determine the following test signal equation:

$$s_1^{test}(t_k) = D^q_{mod(k+\phi_1,N)} \cdot \exp(j2\pi f_p t_k + \alpha) \quad (5)$$

Wherein α is an arbitrary phase of the test signal as generated from the test signal generation device 403.

Each correlator C1-CN of the correlators bank 404 is further provided with a respective output Cout1-CoutN at which is available the result of the corresponding correlation operation executed by the corresponding correlator.

The correlation operation of formula (3) expresses a numerical filtering operation entailing the definition of a filtering or integration band δF, equal to the inverse of the coherent integration time Tint:

$$\delta F = 1/T_{int}$$

The central frequency of the integration band δF is the test frequency fp.

The controller module 402 is configured to generate the first and second configuration data $D_{C1}$ and $D_{C2}$, to be provided at the input of the correlators bank 404, and receive at the input the results of the correlation operations available at outputs Cout1-CoutN of the correlators bank 404.

Further, the controller module 402 is configured for receiving at the input a third configuration datum $D_{C3}$ representing one of a first acquisition sensitivity, a fourth configuration datum $D_{C4}$ representing a second acquisition sensitivity, a fifth configuration datum $D_{C5}$ representing a first frequency search range, and further a sixth configuration datum $D_{C6}$ representing a second frequency search range.

Further, the controller module 402 is configured to generate test frequencies $f_{pi}$ to be delivered to the test signal generation device 403, and is configured to execute control logic of the process of acquiring the signals from different satellites visible to the receiving apparatus 100. Such controller module 402 is embodied, for example, as a software module implementable by a microcontroller.

As a function of the correlation results available at the outputs Cout1-CoutN, configuration data $D_{C3}$- $D_{C6}$, and its own control logic, the controller module 402 generates at its own outputs an estimated Doppler frequency value $\hat{f}_d$ and an estimated code phase value $\hat{\phi}$ to be made available at the tracking module 5.

The test signal generation device 402 is configured to generate a plurality of test signals $\{s_1^{test}(t_k) \ldots s^{test} N(t_k)\}$ to be provided to the correlator modules bank 404, as the function of the test frequency value $f_{pi}$ received from the controller module 402 and a clock signal CLK provided by a timing module 405 ($TC_{XO}$), such as, for example, a temperature-controlled quartz oscillator.

The configuration module 401 is enabled to set and in addition or alternatively perform estimate calculations of some of the data configuration values $D_{C3}$-$D_{C6}$.

Further, it is observed that a quantity indicating the performances of the acquisition method executed by the acquisition module 4 is the reception sensitivity. The reception sensitivity can be quantified by a parameter "minimum signal/noise ratio Q" defined as the low point (e.g., minimum) signal/noise ratio associated to signal s(t) from the satellite as received at the receiving apparatus 100 and detected by a probability of detection (POD), wherein POD is a project value.

As it is apparent a greater sensitivity corresponds to a lower value of the minimum signal/noise ratio Q.

Example of the Acquisition Method

FIGS. 3-6 show by flow diagrams an embodiment of an acquisition method 500, implementable, for example, by the acquisition module 4.

The acquisition method 500 comprises, after a symbolic start step 501 (START), a first band configuration step 502 wherein it is defined a first search frequency range $B_{ind-1}$ and a first sensitivity configuration step 503.

More particularly, the first band configuration step 502 comprises a central frequency estimate step 504, a first band amplitude estimate step 505, and a first band allocation step 506.

Specifically, it is noted that the first band configuration step 502 can be applied under the assumption the receiving apparatus 100 is in a Hot/Warm start state. As stated above, under this state, a high-point (e.g., maximum) reception Doppler uncertainty is considered null because under such state it is possible to predict both the satellites in view and their velocities and it is assumed the positions at the last switching-off and the time propagation to the current position are available and valid. Substantially, the Hot/Warm start state occurs when, for example, the receiving apparatus 100 is turned on again in the same location where it was turned off the preceding time and is provided with a backup clock enabling to propagate the time to the switching-on instant from the last switching-off, this is advantageous in order to effectively execute the prediction operations on the visible satellites and their velocities.

In the first frequency estimate step 504, an estimate of the correct intermediate frequency $\hat{f}_{IF}$ at which the received digital signal $s_{RX}(t_k)$ has been converted by the radio-frequency stage 2 (FIG. 1) is performed. This estimate, according to an embodiment, is performed by summing the work intermediate frequency $f_{IF}$ at which the radio-frequency stage 2 operates and the Doppler shift calculated as a function of the satellite motion $\delta f_{SAT}$ of which it is desired to acquire the pseudo-random code, as described in the following equation:

$$\hat{f}_{IF}=f_{IF}+\delta f_{SAT} \qquad (7)$$

Such estimated intermediate frequency value $\hat{f}_{IF}$ has been selected as a central frequency of the first search frequency range $B_{ind-1}$.

In the first estimate band amplitude step 505, the first search frequency range $B_{ind-1}$ is selected in order to have a determined amplitude as a function of the expected high point (e.g., maximum) offset with respect to the predicted intermediate frequency.

According to an embodiment, the first search frequency range $B_{ind-1}$ has been calculated as a function of the maximum frequency offset $\delta f_{LO}$ predicted of the local oscillator 405 (FIG. 2). More particularly, the value $B_{ind-1}$ can be selected for example as in the following formula:

$$B_{ind-1}=\delta f_{LO} \qquad (8)$$

wherein it is assumed that the Doppler shift due to the receiving apparatus 100 motion is negligible compared to the maximum frequency offset $\delta f_{LO}$ of the local oscillator 405.

The step 504 of estimating the central frequency and the first step 505 of estimating the band amplitude can be implemented by the configuration module 401.

In the first band allocation step 506, the estimated intermediate frequency value $\hat{f}_{IF}$ and the first search frequency range $B_{ind-1}$ are provided by the configuration module 401 to the controller module 402, for example, as values taken by the fifth configuration datum $D_{C5}$. The first sensitivity configuration step 503 comprises a first sensibility selection step 507, a first integration time calculation step 508 and a first correlator configuration step 509.

In the first sensitivity selection step 507, it is defined a first sensitivity value corresponding to a first value of the minimum signal/noise ratio Q1. Such first value of the minimum signal/noise ratio Q1 is, for example, stored in the configuration module 401 and is made available in the controller module 402 as a value taken by the third configuration datum $D_{C3}$. For example, the first value of the minimum signal/noise ratio Q1 is comprised between 38.00 dB and 55.00 dB, more preferably between 41.00 dB and 52.00 dB and, still more preferably, between 44.00 and 49.00 dB.

In the first step 508 of calculating the integration time, executable, for example, by the controller module 402, as a function of the first value of the minimum signal/noise ratio Q1, it is also selected a first value of the coherent integration time Tint1=m1 T, to be used for applying formula (3), which is substantially matched by the first value Q1. The first time integration value Tint1 is expressed by the parameter m1 defining the code period number T which the correlation operation, corresponding to formula (3), extends for. It is observed that the sensitivity increases as the integration time increases, and therefore the minimum signal/noise ratio Q decreases as the coherent integration time increases.

In the first correlator configuration step 509, the first value of the integration time Tint1 is made available at the correlators bank 404 as a value taken by the first configuration datum $D_{C1}$. By considering, according to an example, the application of a coherent correlation, the second configuration datum $D_{C2}$, indicating a first number Nstep1 of incoherent integration steps, is set to 1.

Further, the acquisition method 500 comprises a first frequency calculation step 510 in which it is determined the plurality of test frequencies:

$$f_1p_1 - f_1p_{Nb1} \quad (9)$$

inside the first search frequency range $B_{ind-1}$.

By definition of the plurality of test frequencies $f_1p_1$-$f_1p_{Nb1}$ it is performed a first frequency spacing calculation step 511 in which it is calculated, for example by the controller module 402, a first frequency spacing $\delta F_{bin-1}$. Such first frequency spacing is selected, for example, equal to the width of a first integration band $\delta F1$ of the given correlation operation (according to relation (6)) from formula $\delta F1=1/T$ int1, reduced according to a suitable tolerance margin expressed by a coefficient Moverlap≤1, as in formula:

$$\delta F_{bin-1} = \delta F1 \cdot Moverlap \quad (10)$$

The first frequency spacing $\delta F_{bin-1}$ is the distance between the plurality of test frequencies $f_1p_1$-$f_1p_{Nb1}$.

Particularly, it is noted that the coefficient Moverlap can be for example equal to 0.8.

By selecting the coefficient Moverlap less than 1, it is determined the partial overlapping of the integration bands of each correlator C1-CN, associated to adjacent test frequencies, in this way enables a substantially complete scan of the first frequency band $B_{ind-1}$.

Further, the first frequency calculation step 510 comprises a first step of calculating the bin number 512, in which it is calculated a first bin number Nb1 representing the number of test frequencies contained in the plurality $f_1p_1$-$f_1p_{Nb1}$. The first "bin number" is calculated as equal to the ratio between the first search frequency range $B_{ind-1}$ and the first frequency spacing $\delta F_{bin-1}$, as expressed by the following formula:

$$N_{b1} = B_{ind-1}/\delta F_{bin-1} + 1 \quad (11)$$

The first search frequency range $B_{ind-1}$, the first frequency spacing $\delta F_{bin-1}$, and the first bin number Nb1 enable to define, in a frequency configuration step 513, the plurality of test frequencies $f_1p_1$-$f_1p_{Nb1}$, whose frequency values will will be made available at the test signal generation device 403.

Therefore, the acquisition method 500 comprises (FIG. 4) a first acquisition step 540 comprising: a first correlation calculation step 514, a first selection step 515 and a first comparison step 516.

The first correlation calculation step 514, performed as a function of the above mentioned configurations, is a consequence of the selection of the first value of the minimum signal/noise ratio Q and first search frequency range $B_{ind-1}$.

Such first correlation calculation step 514 is performed by a combined code phase and frequency scans. Particularly, the test signal generation module 403, controlled by the control module 402, generates, for each code phase $\Phi 1$-$\Phi N$, a plurality of test signals $\{s_1^{test}(t_k) \ldots s^{test}_N(t_k)\}$ each formed by using a sinusoidal signal having a different test frequency among the Nb1 calculated test frequencies $f_1p_1$-$f_1p_{Nb1}$, by therefore performing a frequency scan. Each correlator C1-CN performs the correlation calculation by returning a number Nb1 of correlation results.

The code phase scan is performed, for example, by having each correlator C1-CN to receive from test signal generation module 403, a plurality of test signals $s_i^{test}(t_k)$ having a different phase $\phi 1$-$\phi N$ of the pseudo-random code $D_i(k)$, used for forming the test signal. The test signal generation module 403 generates such codes with a different phase, for example, by a circular shifting of a basic sequence of Ns samples.

Therefore, in the first correlation calculation step 514, it is performed a plurality of coherent integrations of the type expressed by formula (3), among the digital signal $s_{RX}(t_k)$ received at the acquisition module 4 and the plurality of test signals $s_i^{test}(t_k)$ generated by returning a number Nt1 of first correlation results $CORR1_1$-$CORR1_{Nt1}$ available at the outputs Cout1-CoutN; wherein Nt1=N Nb1.

It is noted that the above mentioned first correlation calculation step 514 is based on coherent integrations but such step 514 can be performed, according to another embodiment, by incoherent integrations.

According to the incoherent integration mode, the calculation of the first correlation results $CORR1_1$-$CORR1_{Nt1}$ is performed for a first number Nstep1 of times and it is executed each time on an integration interval consecutive to the previous one and having an amplitude equal to the first coherent integration interval Tint1=m1 T. The results of such correlation calculations are then accumulated, by summing one to the other the Nstep1 homologous correlation results (that is, those results associated to the same code phase and to the same test frequency) by generating, in this way, a total number of Nt1=N Nb1 correlation results.

It is observed that when the first calculation step 514 is performed by the incoherent integration, the controller module 402 will output a first configuration datum $D_{C1}$ to correlators C1-CN, equal to the first incoherent correlation step number Nstep1.

As it was observed, the sensitivity, and therefore the first value of the minimum signal/noise ratio Q1, is bound to an incoherent integration time T*int1, which can be expressed, in case of an incoherent correlation, as an integer multiple, according to the coefficient m1, of the code period T and of the first incoherent integration step number Nstep1: T*int1=m1× T×Nstep11.

For example, m1=1, Tint=1 ms, Nstep1=4 implies a sensitivity Q=40 dB (POD 50%).

It is noted to the persons skilled in the art the adoption of approaches of the "trial and error" type for measuring the sensitivity and therefore the minimum signal/noise ratio Q, in other words it is done a number of statistically significant tests for a given level of the signal/noise ratio CnO and it is evaluated the PoD obtained by the receiving apparatus under test. The result depends on the implementative quality of the correlation hardware (for example, on the resolution of the receiving code, on the quantization of the input datum) and on the treatment signal real sequence.

In a first following selection step 515, the controller module 402 selects a maximum correlation value CORR1max, inside the first correlation results $CORR1_1$-$CORR1_{Nt1}$. To this maximum correlation value CORR1max are associated a corresponding code step value $\Phi$ (belonging to the plurality $\Phi 1$-$\Phi N$) and a corresponding test frequency f (belonging to the plurality $f_1p_1$-$f_1p_{Nb1}$), used for calculating the correlation calculation causing the result CORR1max.

In a first comparison step 516, the maximum selected value CORR1max is compared with a first threshold value TH1. If the selected value CORR1max is greater than the first threshold value TH1, it is considered done the acquisition of the satellite associated to the code datum $D_k$ (branch Y and end step END). In this case, the code phase $\hat{\phi}$ and frequency $\hat{f}_d$ values are transferred to the tracking module 5 which will perform the time tracking of the signal from the same satellite.

In case the selected value CORR1max is not greater than the first threshold value TH1 (branch N), the acquisition method 500 continues (FIG. 4) with a second band configuration step 517 (in which it is defined a second search frequency interval $B_{ind-2}$) and a second sensitivity configuration step 521.

More particularly, the second band configuration step 517 comprises a central frequency definition step 518, a second band amplitude estimation step 519, and a second band allocation step 520.

The central frequency definition step 518 provides the selection of the same estimated central frequency $\hat{f}_{IF}$ obtained by the central frequency estimate step 504.

In the second band amplitude estimate step 519, the second search frequency interval $B_{ind-2}$ is selected so that it has an amplitude less than the one of the first frequency search interval $B_{ind-1}$ as expressed in the following relation:

$$B_{ind-2} < B_{ind-1}. \tag{12}$$

The amplitude of the second search frequency interval $B_{ind-2}$ can be, for example, calculated as a function of the high-point expected Doppler shift $\delta f_{RIC}$ at the carrier frequency of the satellite signal received at antenna 1 due to the receiving apparatus 100 motion, by assuming at the same time a zero frequency offset of the local oscillator 405.

It is considered, for example, a high displacement velocity of the receiving apparatus 100 equal to 200 km/h, corresponding to a Doppler shift of the signal received at antenna 1 of $\delta f_{RIC}$=200/3.6/ 0.19=293Hz; (wherein 3.6 represents the conversion from km/h to m/s and 0.19 m is the wavelength GPS), in case of the GPS system.

The second search frequency interval $B_{ind-2}$ can be selected, for example, in order to be equal to the high-point Doppler shift $\delta f_{RIC}$=293 Hz.

In the second band allocation step 520, the second search frequency interval $B_{ind-2}$ is selected equal to the high-point expected Doppler shift $\delta f_{RIC}$. In this way, relation (12) is satisfied. Further, in the second band allocation step 520, the second search frequency interval $B_{ind-2}$ is provided by the configuration module 401, in which the estimate was done, to the controller module 402, for example, as a value taken by the sixth configuration datum $D_{C6}$.

The second sensitivity configuration step 521 comprises a second sensitivity selection step 522, a second integration time calculation step 523, and a second correlator configuration step 524.

In the second sensitivity selection step 522, it is defined a second sensitivity value corresponding to a second value of the minimum signal/noise ratio Q2. Such second value of the minimum signal/noise ratio Q2 is, for example, calculated by the configuration module 401 and is made available in the controller module 402 as a value taken by the fourth configuration datum $D_{C4}$.

In this second sensitivity selection step 522, it is selected a sensitivity greater than the first sensitivity and therefore it is selected a second minimum signal/noise ratio Q2 smaller than the first minimum signal/noise ratio Q1:

$$Q2 < Q1 \tag{13}$$

Further, the second minimum signal/noise ratio Q2 is selected in order to result in a value much greater than the power value RPL (Side Peak Rejection) indicating the power difference between the main lobe and the secondary lobe of a signal received at antenna 1 and not acquired during the processing corresponding to the steps 501-516, therefore equal to Q1-RPL:

$$Q2 >> Q1 - RPL \tag{14}$$

the first value Q1 being interpreted as a high signal/noise ratio of a signal received and not successfully acquired during the first acquisition step.

The value RPL can be fixed to, for example, 27 dB for GPS-type systems.

It is noted that the term "much greater" means that, by expressing the quantities in decibels, the difference between the second value Q2 and value Q1-RPL should be at least equal to 4 dB, in other words:

$$Q2 = (Q1 - RPL) > 4 \text{ dB} \tag{15}$$

In the second integration time calculation step 523, it is defined a second value of the coherent Tint2 or incoherent integration interval T*int2, depending on the sensitivity and therefore on the second value Q2, and given by:

$$Tint2 = m2 \times T, \text{ for the coherent integration, or} \tag{16}$$

$$T^*int2 = m2 \times T \times Nstep2, \text{ for the incoherent integration.} \tag{17}$$

In the relations (16) and (17), m2 is another project coefficient and Nstep2 is a second step number of incoherent integrations, as it will be better understood in the following.

The second coherent or incoherent integration intervals Tint2 and T*int2 and the second step number Nstep2 can be different from the previously defined ones Tint1, T*int1 and Nstep1.

Particularly, in order to satisfy relation (13) (Q2>Q1) regarding the sensitivity, it will be further confirmed that the second coherent integration time Tint1 is greater than or equal to the first integration time Tint1

$$Tint2 \geq Tint1 \tag{18}$$

and the second step number Nstep2 will be greater than or equal to the first step number Nstep1:

$$Nstep2 > Nstep1 \tag{19}$$

wherein the equality condition is verified only in relation (18) or only in relation (19).

The selection of the second coherent integration time Tint2 also entails the determination of a second integration band associated to correlators C1-CN, given by the following relation:

$$\delta F2 = 1/Tint2 \tag{20}$$

which can be different from the first integration band $\delta F1$ regarding the first coherent integration time Tint1.

In the second correlator configuration step 524, the second value of the integration interval Tint2 or T*int2 is made available at the correlators bank 404 as a value taken by the first configuration datum $D_{C1}$ and the second step number Nstep2 (Nstep2 equal to 1 for the coherent integration) is made available at the correlators bank 404 as a value taken by the second configuration datum $D_{C2}$.

Further, the acquisition method 500 comprises a second frequency calculation step 525 which determines the second plurality of test frequencies:

$$f_2p_1 - f_2p_{Nb2} \tag{21}$$

in the second search frequency interval $B_{ind-2}$. Due to the definition of the second plurality of test frequencies $f_2p_1$-$f_2p_{Nb2}$ it is performed a second step 526 of calculating the frequency spacing wherein it is for example calculated by the controller module 402, a second frequency spacing $\delta F_{bin-2}$.

Such second frequency spacing is for example selected equal to the width of the second integration band $\delta F2$ of the correlation operation, defined by formula (20), reduced according to a suitable tolerance margin expressed by another coefficient Moverlap2≤1, as in the formula:

$$\delta F_{bin-2} = \delta F2 \cdot \text{Moverlap2} \quad (21)$$

the second frequency spacing $\delta F_{bin-2}$ is the distance between the second plurality of test frequencies $f_2 p_1 - f_2 p_{Nb2}$.

Further, the second frequency calculation step 526 comprises a second step of calculating the bin number 527, in which it is calculated a second bin number Nb2 representing the number of test frequencies included in the plurality $f_2 p_1 - f_2 p_{Nb2}$.

The second bin number Nb2 is calculated as equal to the ratio between the second search frequency interval $B_{ind-2}$ and the second frequency spacing $\delta F_{bin-2}$, as expressed by the following formula:

$$N_{b2} = B_{ind-2} / \delta F_{bin-2} + 1 \quad (22)$$

(the value +1 regards the central bin at frequency $\hat{f}_{IF}$).

It is noted that, according to a particular case, the second search frequency band $B_{ind-2}$ can be selected in order to be contained in the second integration band $\delta F2$. This selection entails that the second bin number Nb2 is equal to 1.

The second search frequency interval $B_{ind-2}$, the second frequency spacing $\delta F_{bin-2}$, and the second bin number Nb2 enable to define, during a frequency configuration step 528, the second plurality of test frequencies $f_2 p_1 - f_2 p_{Nb2}$, whose frequency values $f_{pi}$ will be made available at the test signal generation device 401.

Therefore, the acquisition method 500 includes a second acquisition step 550 (FIG. 6) comprising: a second correlation calculation step 529, a second selection step 530, and a second comparison step 531.

More particularly, the second correlation calculation step 529 is performed as a function of the configurations described with reference to steps 517-525 and consequently as a function of the selection of the second value of the minimum signal/noise ratio Q2 and second search frequency interval $B_{ind-2}$. The kind of processing performed in the second correlation calculation step 529 is analogous to that of the processing performed in the first correlation calculation step 514.

The second correlation calculation step 529 is performed by a combined frequency and code phase scan. Particularly, the test signal generation module 403, controlled by the control module 402, generates, for each code phase $\Phi 1 - \Phi N$, a plurality of test signals $s_i^{test}(t_k)$, each structured by using a sinusoidal signal having a different test frequency among the Nb2 calculated test frequencies $f_2 p_1 - f_2 p_{Nb2}$, by performing therefore a frequency scan. Each correlator C1-CN performs the correlation calculation by returning a number Nb2 of correlation results.

The code phase scan is performed, for example, by making each correlator C1-CN to receive from the test signal generation module 403 a plurality of test signals $s_i^{test}(t_k)$, having a different phase $\Phi 1 - \Phi N$ of the pseudo-random code Di(K), used for structuring the test signal.

Therefore, in the second correlation calculation step 529, it is performed a plurality of coherent integrations, of the type represented by formula (3), between the digital signal $s_{RX}(t_k)$ received at the acquisition module 4 and the plurality of test signals $s_i^{test}(t_k)$ generated, by returning a second number Nt2 of second correlation results $CORR2_1 - CORR_{Nt2}$; wherein Nt2=N Nb2 are available at outputs Cout-CoutN.

It is noted that the above mentioned second correlation calculation step 529 is based on coherent integrations, but such step can be performed according to another implementation, by calculating a number equal to Nstep2 of incoherent integrations.

It is observed that when the second correlation calculation step 529 is performed by incoherent integrations, the controller module 402 will output a first configuration datum $D_{C1}$ to the correlators C1-CN, equal to the second step number of incoherent integrations Nstep2.

In a successive second selection step 530, the controller module 402 $\Phi$ selects a maximum correlation value CORR2max among the second correlation results $CORR2_1 - CORR_{Nt2}$. A corresponding second code phase value $\Phi_{2s}$ (belonging to a plurality $\Phi 1 - \Phi N$) and a corresponding second test frequency $f_{2ps}$ (belonging to a second plurality $f_2 p_1 - f_2 p_{Nb2}$), are associated to this maximum correlation value CORR2max, which are used for the correlation calculation which determined the result CORR2max.

In a second comparison step 531, the second selected maximum value CORR2max is compared with a second threshold value TH2. If the second selected maximum value CORR2max is greater than the second threshold value TH2, the acquisition of the satellite associated to the code datum $D_k$ is determined as done (branch $\underline{Y}$). In this case, the second code phase value $\Phi_{2s}$ and the second test frequency $f_{2ps}$ are transferred to the tracking module 5 which will perform the time tracking of the signal from the same satellite.

In the second comparison step 531, it is observed that if the second selected maximum value CORR2max is smaller than or equal to the second threshold value TH2, the acquisition method could continue by defining another sensitivity with a third value Q3 of the minimum signal/noise ratio smaller than the second value Q2 and defining a third search frequency interval $B_{ind-3}$, smaller than the second search frequency interval $B_{ind-2}$. Then, thanks to these definitions, a third integration time Tint3, a third step number Nstep3, a third frequency spacing $\delta F_{bin-3}$, a third bin number Nb3, and a third plurality of test frequencies $f_2 p_1 - f_2 p_{Nb2}$ are calculated. Therefore, it is possible to perform a third correlation calculation step, a third maximum value selection step, and a third comparison step with a suitable threshold until it is acquired the signal from the satellite or until a final result of a failed acquisition of that satellite.

The acquisition method 500 can also provide further correlation calculation steps analogous to the above mentioned steps, performed under conditions of increasing sensitivity and in search frequency intervals of decreasing amplitude.

It is observed that the first correlation calculation step 514 is performed in a time Tproc1 which can be considered equal to:

Tproc1=Nb1 Nstep1 Tint1 =

($B_{ind-1}/\delta F1+1$) Nstep1 Tint1, (?) with:

$$B_{ind-1} \text{ Nstep1 Tint1}^2 \quad (23)$$

The second correlation calculation step is performed in a time

Tproc2=Nb2 Nstep2 Tint2=

($B_{ind-2}/\delta F2+1$) Nstep2 Tint2, (?) with:

$$B_{ind-2} \text{ Nstep2 Tint2}^2 \quad (24)$$

Due to the relations (18) and (19), it results that:

$$\text{Nstep1 Tint1} < \text{Nstep2 Tint2} \quad (25)$$

Further, the second search frequency interval $V_{ind-2}$ while it is satisfied the relation (18), is selected so that the following relation is valid:

$$\text{Tproc1} < \text{Tproc2} \quad (26)$$

It is noted that the described acquisition method 500 enables to acquire the signals transmitted from the satellites by avoiding the aliasing problem, due to secondary lobes of the transmitted signal. Since the first correlation calculation step 514 is performed by adopting the first search frequency interval $B_{ind-1}$ defined by the previously described criterion, such first correlation calculation step is substantially not subjected to the aliasing problem since the main correlation peak falls into the first search frequency internal $B_{ind-1}$.

The first correlation calculation step 514 is performed with a low sensitivity, for example 38 dB<Q<55 dB. When there is a received signal $s_{RX}(t_k)$ having a power greater than the first value Q1 of the minimum signal/noise ratio, the signal will be successfully acquired with a probability of detection (POD) determined by the threshold selection TH.

If the first correlation calculation step causes a failed acquisition of the signal, the signal power is, with high chance, smaller than the first value Q1 of the minimum signal/noise ratio. Under this circumstance, the power of the secondary lobe of the signal is, at most, given by Q1-RPL [dB], the power of the secondary lobe being smaller than the one of the main lobe of the signal transmitted with a quantity equal to RPL dB. Thanks to the sizing of the second sensitivity, that is of the second value Q2 of the minimum signal/noise ratio, as previously described, it results that the second correlation calculation step 529 will not be subjected to the aliasing phenomenon in that the maximum power of the secondary lobe Q1-RPL is much smaller than Q2.

Experimental Tests

Figure 7:
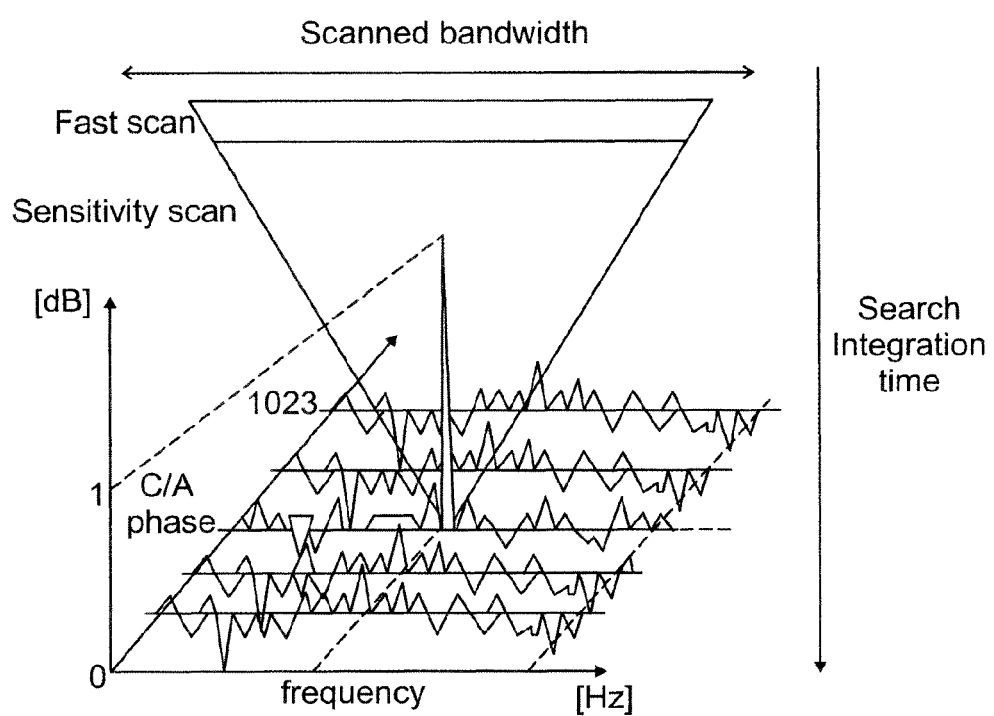
FIG. 7 shows by an illustrative graphic representation, an example of an application of said acquisition method.

FIG. 7 shows, by a graphic outline, a performed experiment wherein it is implemented the acquisition method 500.

The first acquisition step 540 (fast scan) has been performed with an incoherent integration under the following conditions:

$B_{ind-1}$=6.4 KHz

Tint1=1 ms (time of coherent integration)

Nstep1: 4

The first value Q1 of the minimum signal/noise ratio is equal to about 40 dB and, by subtracting a value RPL equal to 30 dB, this assures that the possible next second acquisition step 560 (sensitivity scan) is protected from alias as far as Q1-RPL=40-30=10 dB, wherein 10 dB is a practical limit of no interest.

The successive search (second acquisition step 550) is a processing performed under the following conditions:

Tint2: 4 ms;

Nstep2: 256

The second value Q2 of the minimum signal/noise ratio is equal to about 20 dB (POD 50%).

The duration of the total scan (first and second acquisition steps 540 and 550) is equal to about Tproc: 256*4+4*9*1=1060 ms. With an overhead bound to the first acquisition step 540, fast scan is of 6% only (it is observed that (256*4+36)/(256*4)=1.035).

Referring now to the standard techniques, by using the same search time Tproc=1060 ms, with an integration time equal to 1 ms, and a step number equal to 512 for equally spaced 3 bins, for covering a possible uncertainty of 1600 Hz, it is noted that it will be produced a minimum signal/noise ratio Q equal to 24.5 dB, that is more than 4.5 dB with respect to the value of 20 dB obtained with the above described second acquisition step 550.

Further, it can be noted that when it is used a standard technique, and it is used all the integration time, 1 s, for a single bin at the prediction frequency, the sensitivity would only be increased of 1.5 dB while having at the same time the risks of alias outside the search band (for example, 1 or 2 KHz).

Figure 8:
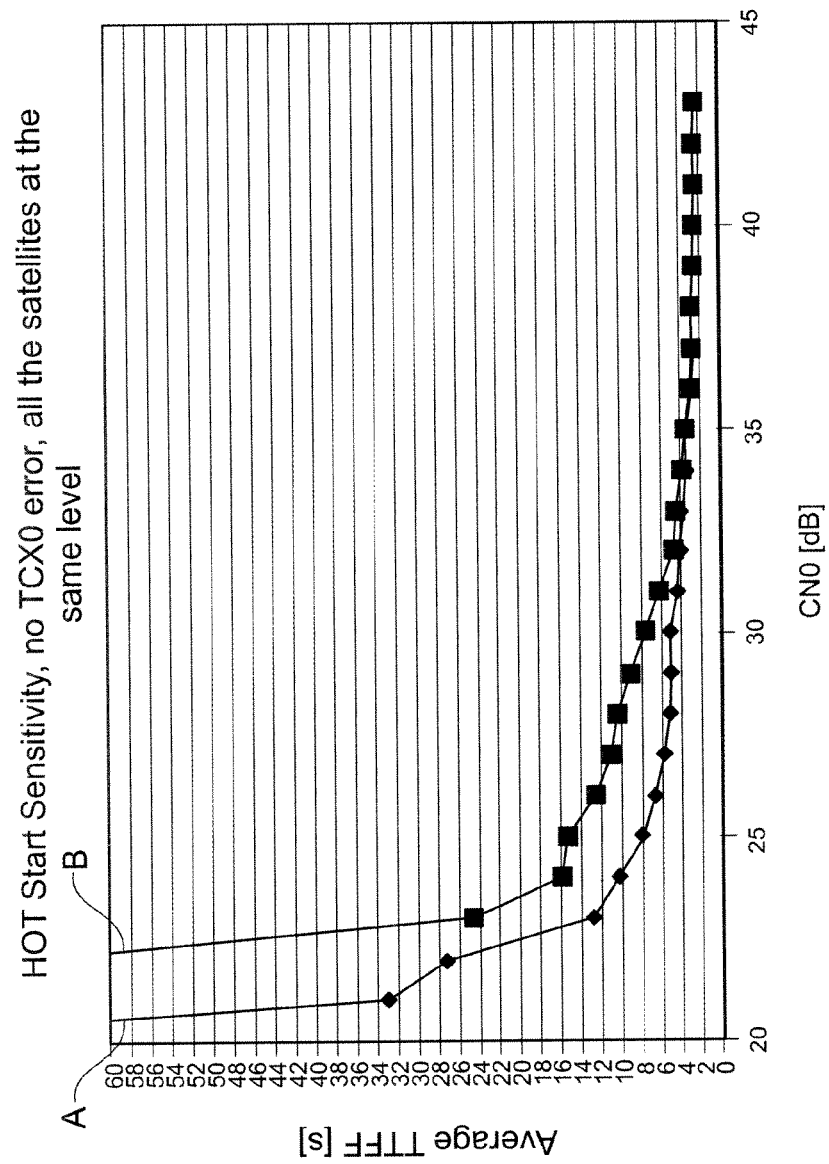
FIG. 8 and FIG. 9 refer to a comparison of experimental tests of the disclosed acquisition techniques with conventional techniques.

FIG. 8 shows a first curve A which highlights the performances of a receiving apparatus 100, provided with an acquisition module 4 as described before. Further, FIG. 8 shows a second curve B of a standard type receiving apparatus provided with a standard acquisition module. It is assumed that the search times are substantially equal for both cases and the hot start conditions are valid, the ephemeris data are available, and therefore the fix time TTFF is substantially determined by the capacity of acquiring visible satellites. Further, it is assumed absent the error of $TC_{XO}$. Curves A and B refer to the fix time with respect to the signal/noise ratio CNO.

As it is noted, the first curve A shows fix times reduced with respect to the ones of the second curve B.

Figure 9:
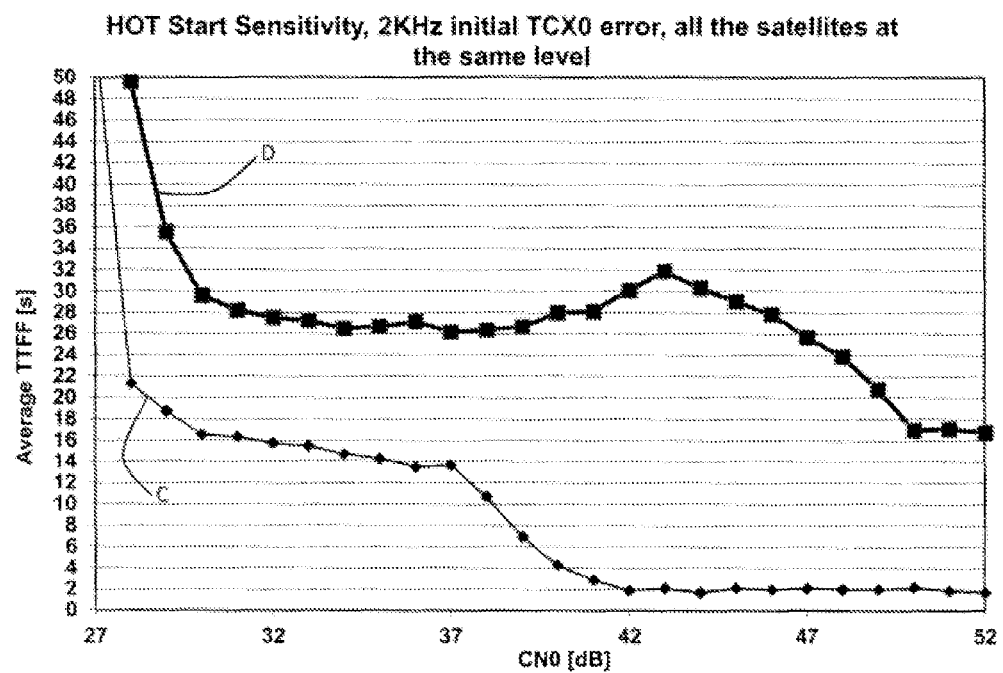

FIG. 9 refers to a case analogous to the case of FIG. 8 however, it is considered the presence of an additional error of 2 kHz overlapped on the predictions by an estimate set as incorrect of the local $TC_{XO}$. FIG. 9 shows a third curve C of a receiving apparatus 100 provided with an acquisition module 4 as the above described one, and a fourth curve D which refers to a standard receiving apparatus. It is noted that the third curve C has fix times reduced with respect to the one of the fourth curve D.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of acquiring a satellite signal, comprising:
   receiving a CDMA-modulated signal;
   defining a first search frequency interval and a first reception sensitivity;
   performing a first acquisition of the CDMA-modulated signal as a function of the first reception sensitivity and the first search frequency interval;
   providing, based on the performed first acquisition, a successful acquisition result or a failed acquisition result;
   in response to providing the failed acquisition result:
   defining a second search frequency interval, narrower than the first search frequency interval, and a second reception sensitivity, greater than the first reception sensitivity, the second search frequency interval depending on a power of a side lobe of the CDMA-modulated signal;
   performing a second acquisition of the CDMA-modulated signal as a function of the second reception sensitivity and of the second search frequency interval; and
   providing, based on the performed second acquisition, a further successful acquisition result or the failed acquisition result.

2. The acquisition method according to claim 1 wherein defining the first search frequency interval comprises:
   estimating a first central frequency of said first search frequency interval from a Doppler shift calculated as a function of motion of a satellite associated with said CDMA-modulated signal; and calculating a width of the first search frequency interval as a function of a maximum frequency offset associated with a local oscillator of a receiving apparatus.

3. The acquisition method according to claim 2 wherein defining a second search frequency interval comprises:

selecting a second central frequency of the second search frequency interval equal to said first central frequency;

calculating a width of the second search frequency interval as a function of a maximum expected Doppler shift in a carrier frequency of the CDMA-modulated signal, the maximum expected Doppler shift based on a motion of the receiving apparatus.

4. The acquisition method according to claim 1 wherein defining a first reception sensitivity comprises:

selecting a first value of a signal/noise ratio associated with the first reception sensitivity;

defining a first integration time value associated with a correlation calculation based on the first reception sensitivity.

5. The acquisition method according to claim 4 wherein defining a second reception sensitivity comprises:

selecting a second value of a signal/noise ratio associated with the second reception sensitivity, the second value of the signal/noise ratio smaller than the first value of the signal/noise ratio, the second value of the signal/noise ratio greater than a difference between the first value of the signal/noise ratio and a value of Side Peak Rejection associated with the side lobe of the CDMA-modulated signal; and defining a second integration time value associated with a correlation calculation based on the second reception sensitivity and greater than said first integration time value.

6. The acquisition method according to claim 1, further comprising:

calculating a first plurality of test frequencies included in said first search frequency interval; and calculating a second plurality of test frequencies included in said second search frequency interval.

7. The acquisition method according to claim 6 wherein performing a first acquisition of the CDMA-modulated signal comprises:

generating a first plurality of test signals having said first plurality of test frequencies and having a first plurality of code phases;

performing a first correlation calculation among the CDMA-modulated signal and the first plurality of test signals to obtain a first plurality of correlation results;

selecting a first maximum value among said first plurality of correlation results;

comparing the first maximum value with a first threshold; and providing, based on comparing the first maximum value, the successful acquisition result or the failed acquisition result.

8. The acquisition method according to claim 7 wherein performing the first correlation calculation comprises:

selecting a first value of a minimum signal/noise ratio associated with the first reception sensitivity;

defining a first integration time value based on the first reception sensitivity; and performing a first plurality of correlation calculations having said first integration time value.

9. The acquisition method according to claim 7 wherein performing a second acquisition of the CDMA-modulated signal comprises:

generating a second plurality of test signals having the second plurality of test frequencies and having a second plurality of code phases;

performing a second correlation calculation among the CDMA-modulated signal and the second plurality of test signals to obtain a second plurality of correlation results;

selecting a second maximum value among said second plurality of correlation results;

comparing the second maximum value with a second threshold; and providing, based on comparing the second maximum value, the further successful acquisition result or the failed acquisition result.

10. The acquisition method according to claim 7 wherein performing the second correlation calculation comprises:

selecting a second value of a signal/noise ratio associated with the second reception sensitivity, the second value of the signal/noise ratio smaller than the first value of the signal/noise ratio, the second value of the signal/noise ratio greater than a difference between the first value of the signal/noise ratio and a value of Side Peak Rejection associated with the side lobe of the CDMA-modulated signal; and defining a second integration time value associated with a correlation calculation based on the second reception sensitivity and greater than said first integration time value;

performing a second plurality of correlation calculations having said second integration time value.

11. The acquisition method according to claim 1, further comprising:

confirming a hot start or a warm start condition before performing the first acquisition of the CDMA-modulated signal.

12. An apparatus to receive satellite signals, comprising:

a CDMA-modulated signal acquisition module including:

a configuration module arranged to define a first search frequency interval and a first reception sensitivity;

a processing module arranged to perform a first acquisition of the modulated signal as a function of the first reception sensitivity and the first search frequency interval, the processing module further arranged to provide a successful acquisition result or a failed acquisition result based on the performed first acquisition;

wherein the configuration module is arranged to, in case of the failed acquisition result, define a second search frequency interval, narrower than the first search frequency interval, and a second reception sensitivity, the second reception sensitivity greater than the first reception sensitivity and the second reception sensitivity depending on a power of a side lobe of the CDMA-modulated signal; and wherein, in case of the failed acquisition result, the processing module arranged to perform a second acquisition of the modulated signal as a function of the second reception sensitivity and the second search frequency interval.

13. The apparatus to receive satellite signals of claim 12, comprising:

an antenna;

an analog reception module arranged to receive a satellite transmitted signal from the antenna, the analog reception module further arranged to produce and pass the CDMA-modulated signal to the CDMA-modulated signal acquisition module.

14. The apparatus to receive satellite signals of claim 12, comprising:
a tracking module arranged to track satellite signals acquired by the CDMA-modulated signal acquisition module;
a sub-frame retrieving module arranged to decode sub-frames passed from the tracking module, the sub-frame retrieving module arranged to form the data navigation messages;
an ephemeris processing and pseudo-range calculation module arranged to store satellite orbit data;
a satellite position calculation module arranged to calculate a satellite position based on data navigation messages and satellite orbit data; and
a user position calculation module arranged to calculate a position of the apparatus based on the satellite position.

15. A memory having stored contents that configure a processing unit to perform a method, the method comprising:
defining a first search frequency range;
defining a first reception sensitivity value;
performing a first acquisition of a CDMA-modulated signal as an iterative correlation function, the first acquisition including the acts of:
applying selected ones of the first search frequency range and the first reception sensitivity value; and
producing a first selected correlation value;
comparing the first selected correlation value to a threshold;
defining a second search frequency range, the second search frequency range narrower than the first search frequency range, the second search frequency range based on a secondary lobe of the CDMA-modulated signal;
defining a second reception sensitivity value, the second reception sensitivity value being greater than the first reception sensitivity value;
performing a second acquisition of the CDMA-modulated signal as an iterative correlation function, the second acquisition including the acts of:
applying selected ones of the second search frequency range and the second reception sensitivity value; and
producing a second selected correlation value.

16. The memory according to claim 15 whose stored contents configure a processing unit to perform a method, the method further comprising:
estimating a first central frequency of the first search frequency range from a Doppler shift calculated as a function of motion of a satellite associated with the CDMA-modulated signal; and
calculating a width of the first search frequency range as a function of a frequency offset associated with a local oscillator of a receiving apparatus;
selecting a second central frequency of the second search frequency range equal to said first central frequency; and
calculating a width of the second search frequency range as a function of an expected Doppler shift in a carrier frequency of the CDMA-modulated signal, the expected Doppler shift based on a motion of the receiving apparatus.

17. The memory according to claim 15 whose stored contents configure a processing unit to perform a method, the method further comprising:
selecting a first value of a signal/noise ratio associated with the first reception sensitivity value;
defining a first integration time value associated with a correlation calculation based on the first reception sensitivity value;
selecting a second value of a signal/noise ratio associated with the second reception sensitivity value, the second value of the signal/noise ratio being smaller than the first value of the signal/noise ratio, the second value of the signal/noise ratio being greater than a difference between the first value of the signal/noise ratio and a value of Side Peak Rejection associated with the secondary lobe of the CDMA-modulated signal; and
defining a second integration time value associated with a correlation calculation based on the second reception sensitivity value and greater than said first integration time value.

18. The memory according to claim 15 whose stored contents configure a processing unit to perform a method, the method further comprising:
calculating a first plurality of test frequencies included in said first search frequency range; and
calculating a second plurality of test frequencies included in said second search frequency range.

19. The memory according to claim 18 whose stored contents configure a processing unit to perform a method, wherein performing the first acquisition of the CDMA-modulated signal comprises:
generating a first plurality of test signals having the first plurality of test frequencies and having a first plurality of code phases;
performing a first correlation calculation among the CDMA-modulated signal and the first plurality of test signals to obtain a first plurality of correlation results, the first correlation calculation including:
selecting a first value of a signal/noise ratio associated with the first reception sensitivity value;
defining a first integration time value based on the first reception sensitivity value; and
performing a first plurality of correlation calculations having the first integration time value; and
selecting a first maximum value among the first plurality of correlation results.

20. The memory according to claim 18 whose stored contents configure a processing unit to perform a method, wherein performing the second acquisition of the CDMA-modulated signal comprises:
generating a second plurality of test signals having the second plurality of test frequencies and having a second plurality of code phases;
performing a second correlation calculation among the CDMA-modulated signal and the second plurality of test signals to obtain a second plurality of correlation results;
selecting a second maximum value among said second plurality of correlation results; and
comparing the second maximum value with a second threshold.

* * * * *